Sheet 1, 3 Sheets.

C. B. Richards.
Adjustment for Microscope.

Nº 47,860.  Patented May 23, 1865.

Witnesses,
Charles F. Howard
Jas L. Howard

Inventor;
C. B. Richards

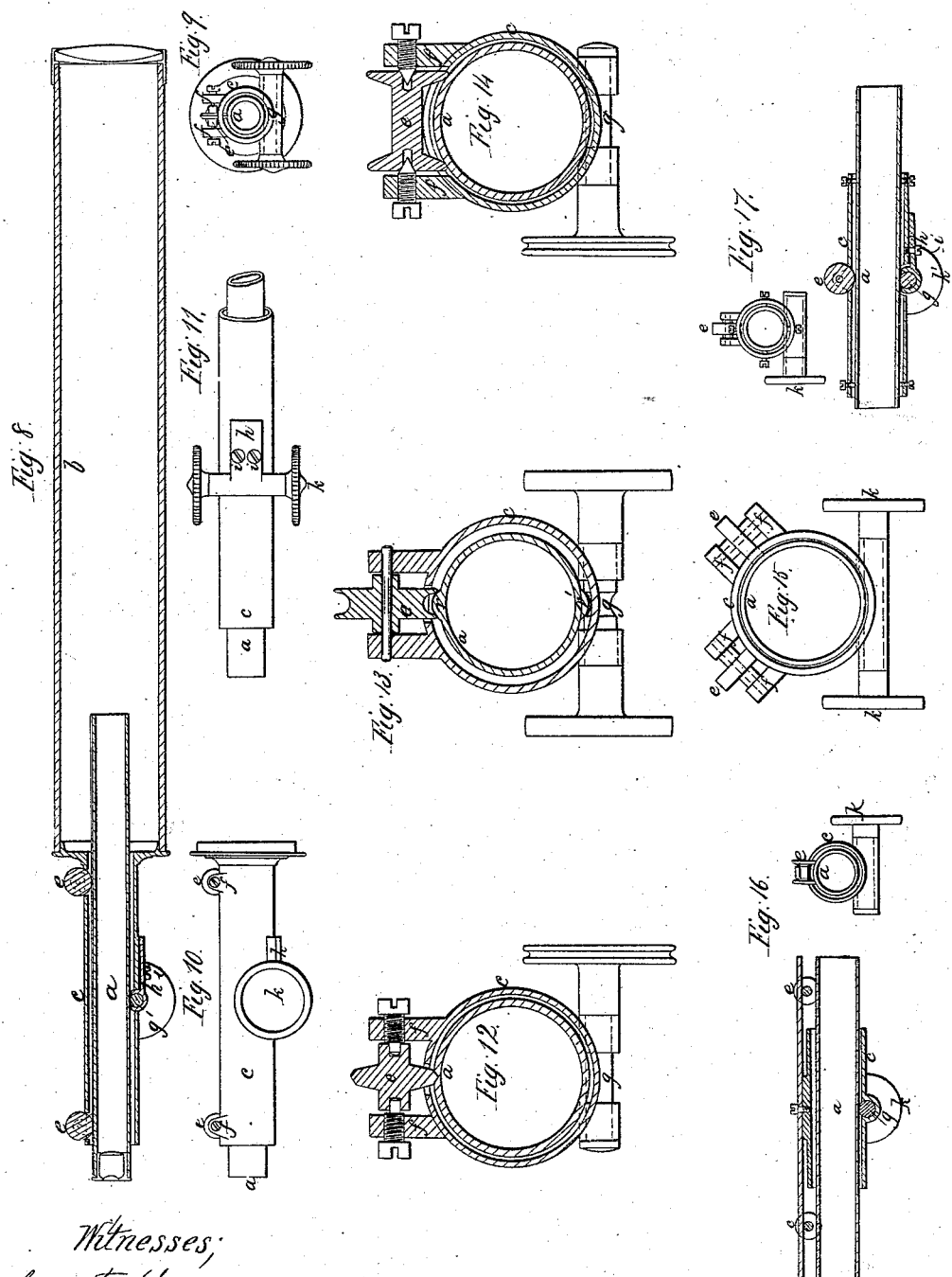

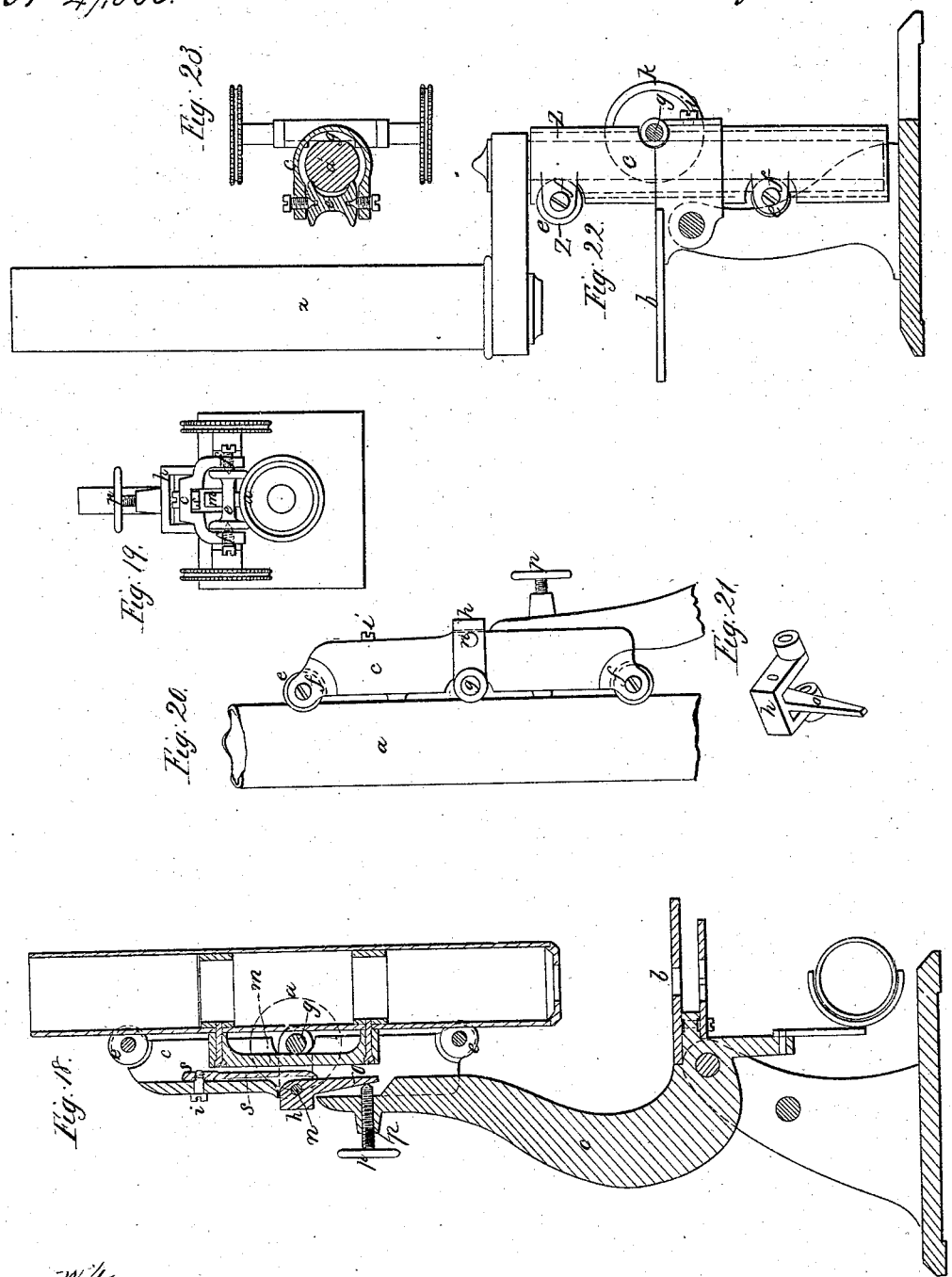

UNITED STATES PATENT OFFICE.

CHARLES B. RICHARDS, OF HARTFORD, CONNECTICUT.

IMPROVEMENT IN ADJUSTMENTS FOR OPTICAL INSTRUMENTS.

Specification forming part of Letters Patent No. 47,860, dated May 23, 1865.

*To all whom it may concern:*

Be it known that I, C. B. RICHARDS, of the city and county of Hartford, in the State of Connecticut, have invented a certain new and useful Improvement in Optical Instruments; and I do hereby declare that the following is a full, clear, and exact description of the same, reference being had to the accompanying drawings, forming part of this specification, and to the letters of reference marked thereon, in the several figures of which drawings similar figures and letters denote the same or corresponding parts.

My invention relates to an improvement in apparatus for effecting the focal adjustment of optical instruments, having for its object the production, at a moderate cost, of an accurate and smooth-working adjustment, being intended as a substitute for the rack-and-pinion movements usually employed to effect such adjustments, and being applicable in most of the cases where these are used.

To this end my said invention consists in so supporting and guiding, on one or more anti-friction wheels, that part of the instrument which is made movable for the purpose of effecting the focusing of the instrument that the movement of this said part may be produced by a smooth friction-roll which is pressed against a smooth surface formed on the movable part, substantially in the manner hereinafter clearly explained.

To enable others skilled in the arts to make and use my invention, I will proceed to a description thereof.

Figure 2:
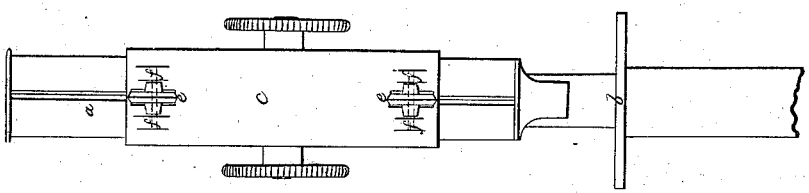
Figure 1:
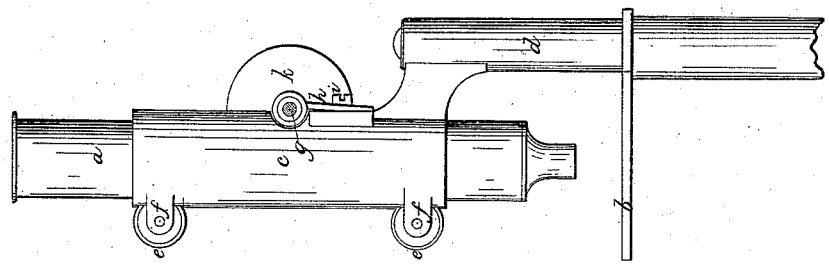
Figure 7:
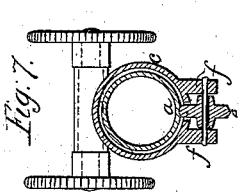
Figure 6:
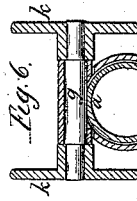
Figure 4:
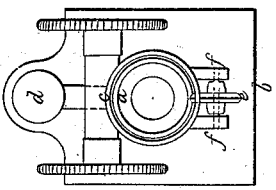
Figure 5:
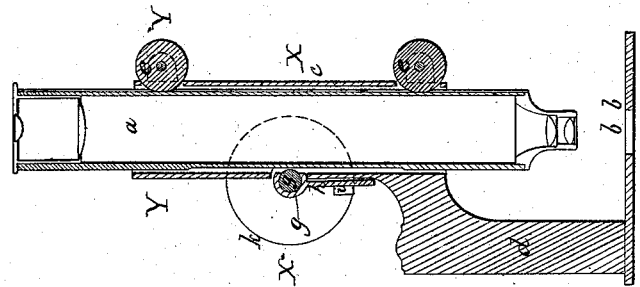
Figure 3:
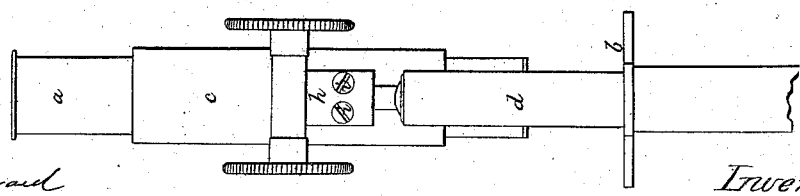

Figures 1 to 7, Sheet No. 1 of the accompanying drawings, represent my invention applied to a compound microscope, Figs. 1, 2, 3, and 4 showing, respectively, a side, front, rear, and top view of the instrument; Fig. 5, a vertical section of the same; and Figs. 6 and 7, cross-sections taken, respectively, at the lines X X and Y Y, in which—

$a$ represents the tube which contains the lenses, and $b$ the stage upon which the object is placed.

$c$ is a tube which surrounds the tube $a$ without touching it. This tube $c$ is firmly supported by the stand or frame $d$, of which it forms a part and to which the stage $b$ is fixed.

$e\ e$ are two anti-friction wheels, the axles of which are supported (in the same vertical plane) in bearings, formed one on the upper and the other on the lower end of the tube $c$, so placed that the wheels touch the tube $a$. The edges of these wheels $e$ are V-shaped, so that they may roll in a similarly-shaped groove, which is made along the surface of the tube $a$, parallel with its axis.

$g$ is a smooth cylindrical-roll (see Figs. 5 and 6) located on the side of the tube $c$, opposite to the wheels $e$ and at a point midway between them, at which place the tube $c$ is cut away to give access to $a$. The roll $g$ turns in bearings formed on an elastic plate, $h$, which is so secured by screws $i\ i$ to the tube $c$ that the roll $g$ may be thereby caused to press with considerable force and yet with a yielding pressure against the tube $a$, which is flattened for a considerable portion of its length on the side where the roll bears. (See Figs. 5 and 6.)

The wheels $e$ must be made of large diameter, as compared with their axles, so that by turning easily they will cause but slight resistance to the motion of the tube $a$ in the direction of its axis, which movement is effected by turning (by the milled heads $k$) the roll $g$, the friction of which against the surface of the tube $a$ gives a reliable moving-force, this friction being very great as compared with the resistance occasioned by the turning of the anti-friction wheels $e$, against which the tube is forced.

It will be seen that the tube $a$ is effectually guided by the wheels $e$, rolling in the groove, and the roll $g$, acting on the flattened surface, so that the turning of the milled heads $k$ gives a good focusing movement to the said tube in the proper direction, and as the yielding pressure afforded by the elasticity of the plate $h$ compensates for inaccuracies of workmanship, the movement of the apparatus will be remarkably smooth and free from the harshness of a movement obtained from a pinion working in a rack.

Figs. 8, 9, 10, and 11, Sheet No. 2, illustrate the application of my invention to an astronomical telescope, Fig. 8 showing a longitudinal section of the instrument, while Figs. 9, 10, and 11 show, respectively, a view of the side, end, and bottom of the rear part, in which $a$ is the tube containing the eye-piece, $b$ the "main tube," at the front end of which is fixed the object-glass, and c a tube secured to b and surrounding a without touching it. The tube a is guided in c by anti-friction wheels e and a friction-roll g, in the same manner as described with reference to tube a in the microscope, already explained, the focusing movement of a in the direction of its axis being effected by turning the friction-roll g by the milled heads k.

Figs. 12, 13, and 14 each represents a cross-section of tubes a and c in a plane passing through the center of one of the anti-friction wheels e, and shows each a different form and application of the friction roll and wheels. That shown in Fig. 12 has been already described.

Fig. 13 shows a grooved anti-friction wheel, e, rolling on a rib, r, formed on the tube a, parallel with its axis. On the opposite side of the said tube is a similar rib, r', parallel with the first, and to receive which the friction-roll g is grooved. The tube a, thus firmly held and guided, may be moved lengthwise by turning the roll g.

Fig. 14 illustrates the form of anti-friction wheel which I consider preferable. It is in the form of a spool, the two heads or flanges, e', of which come in contact with and roll on the cylindrical surface of the tube a in lines parallel with the axis. The friction-roll g is cylindrical and the tube a is flattened throughout a portion of its length equal to its desired lengthwise movement. It will be seen that the tube a, if truly cylindrical, will be accurately guided and its movements be parallel with its axis.

Figs. 15, 16, and 17 illustrate modifications of my invention which need not be described.

Figs. 18, 19, 20, and 21 show the application of my invention to a microscope in a manner somewhat different to that previously described, Fig. 18 being a vertical section, and Fig. 19 a top view, of the instrument; Fig. 20, a side view of the upper part of the same, and Fig. 21 a perspective view of the piece h.

a represents the optical tube; b, the stage which is attached to the lower part of the frame c.

e e are two spool-shaped anti-friction wheels, which turn on pivot-screws having their bearings in ears formed on the frame c, some distance apart. The tube a is in contact with and is guided by these wheels.

g is the friction-roll, which in this case lies on the same side of the tube a as the wheels e, and, instead of pressing against the tube, it is pressed against the flat inner surface of a straight open piece, m, the two ends of which are secured by screws to the tube a, and between the inner vertical surface of which and the tube the roll g passes. The tube a is thus as firmly forced by the roll g into contact with the wheels, and is as accurately guided in its lengthwise movements, as if the roll g pressed upon the opposite side of the tube.

The bearings in which the roll g turns are formed in a peculiarly-shaped piece, h, (see Fig. 21,) which hangs upon a fulcrum-pin, n, about which it is free to turn as a lever, one arm, o, of which is acted upon by a screw, p, against the point of which the said arm is pressed by a spring, s, the pressure of which may be regulated by a screw, i. The spring s serves the double purpose of forcing the friction-roll g into contact with m (which is insured by a loose fit in the frame c of the fulcrum-pin n) and of causing the piece h to swing slightly on pin n when the screw p is operated. The object of this arrangement of the piece h is to afford a means of giving to the tube a a very slow movement, which is produced by turning the screw p, whereby the roll g is slightly raised or lowered, carrying with it the tube. In this way is afforded, at a slight increase of cost, a fine adjustment in addition to the coarse adjustment produced by turning the roll g by the milled heads k.

Figs. 22 and 23 illustrate the application of my invention to another form of microscope, Fig. 22 being a side view of the principal parts of the instrument, and Fig. 23 a cross section at Z Z.

a is the optical tube, the lower part of which is attached to an arm at the upper end of a nearly-cylindrical bar, a', which is parallel with a, and passes through a tube, c, which forms part of the frame of the instrument supporting the stage b. The bar a' is guided in c by the two spool-shaped anti-friction wheels e on the one side and the friction-roll g on the other.

As it is important in this case to prevent the turning on its axis of the bar a', the said bar is formed with two grooves parallel with its axis, in which the flanges of the spool-shaped wheels e roll, and its opposite side is flattened for the roll g to bear against. This arrangement, when the roll g is forced against the bar a' by the elasticity of the plate h, insures a firm and accurate guiding of the said bar, which, when the roll g is turned by milled heads k, receives therefrom a vertical movement proper for the focal adjustment of the optical tube which it carries.

The advantages which I claim for my improvement are, that whereas, to be effective to the desired degree, a rack-and-pinion movement must be nicely fitted by a skillful workman at much expense, and the slides in which the movable parts are guided must be closely adjusted, my improvement may be applied by an ordinary workman at slight expense and give good results, and that a much smoother and more satisfactory adjustment is produced by my invention than by a rack-and-pinion movement.

Having described enough applications of my invention to explain its nature, without intending to limit my claims to the peculiar modifications and applications I have specified, I disclaim as new the general forms of any of the instruments I have shown; nor do I wish to be understood to claim the principle of moving parts of machinery by the friction of a wheel against such parts; but

What I claim as my invention, and desire to secure by Letters Patent, is—

The employment, in combination with the adjustable parts of an optical instrument, of one or more anti-friction wheels, and a friction-roll operating to effect the adjustment to focus, substantially in the manner hereinbefore clearly described, for the purpose set forth.

In testimony whereof I have hereunto set my hand this 11th day of March, 1865.

C. B. RICHARDS.

In presence of—
 CHARLES F. HOWARD,
 JAS. L. HOWARD.